United States Patent
Schulz et al.

(10) Patent No.: US 8,827,290 B2
(45) Date of Patent: Sep. 9, 2014

(54) MULTI-LINK REAR WHEEL AXLE FOR A MOTOR VEHICLE

(71) Applicant: Dr. Ing. h.c.F. Porsche Aktiengesellschaft, Stuttgart (DE)

(72) Inventors: Achim Schulz, Niefern-Oeschelbronn (DE); Michael Johne, Ludwigsburg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 28 days.

(21) Appl. No.: 13/671,576

(22) Filed: Nov. 8, 2012

(65) Prior Publication Data

US 2013/0127130 A1    May 23, 2013

(30) Foreign Application Priority Data

Nov. 22, 2011 (DE) .......................... 10 2011 055 572

(51) Int. Cl.
*B60G 3/20* (2006.01)
*B60G 7/00* (2006.01)

(52) U.S. Cl.
CPC .......... *B60G 7/001* (2013.01); *B60G 2200/462* (2013.01); *B60G 2204/143* (2013.01); *B60G 2200/18* (2013.01); *B60G 7/008* (2013.01); *B60G 7/006* (2013.01); *B60G 2204/148* (2013.01); *B60G 3/20* (2013.01)
USPC .......... 280/124.15; 280/86.758; 280/124.135; 280/124.143; 280/124.148

(58) Field of Classification Search
CPC .......... B60G 7/001; B60G 3/20; B60G 7/008; B60G 2200/18; B60G 2200/182; B60G 2200/4622; B60G 2204/143

USPC .................... 280/124.135, 124.138, 124.139, 280/124.143, 124.144, 124.148, 124.15, 280/86.758

See application file for complete search history.

(56) References Cited

U.S. PATENT DOCUMENTS

| | | | |
|---|---|---|---|
| 4,815,755 A * | 3/1989 | Takata et al. | ........... 280/124.128 |
| 6,938,908 B2 | 9/2005 | Oda et al. | |
| 7,048,286 B2 | 5/2006 | Eppelein | |

(Continued)

FOREIGN PATENT DOCUMENTS

| | | |
|---|---|---|
| DE | 44 23 126 | 6/1995 |
| DE | 100 05 472 | 8/2001 |

(Continued)

*Primary Examiner* — Ruth Ilan
(74) *Attorney, Agent, or Firm* — Gerald E. Hespos; Michael J. Porco; Matthew T. Hespos

(57) ABSTRACT

Multi-link rear wheel axle for a vehicle connects a wheel support (4) to a vehicle body (5) with link arms in upper and lower link planes (8, 6). The upper link plane (8) has a link arm (18) configured as a track rod and front and rear transverse link arms (14, 18) with articulation points (13, 15) for the wheel support (4) and the vehicle body (5). A longitudinal link arm (16) connects the rear transverse link (14) via an articulation point (22) near the wheel support (4) to the front transverse link (18) via an articulation point (24) near the vehicle body. Front and rear transverse link arms (10, 12) in the lower link plane (6) have articulation points (13, 15) for the wheel support (4) and the vehicle body (5) and form a virtual pole (20) outside the lower link plane (6) and behind the axle.

5 Claims, 1 Drawing Sheet

(56) References Cited

U.S. PATENT DOCUMENTS

| | | | |
|---|---|---|---|
| 7,784,806 B2 * | 8/2010 | Schmidt et al. | 280/124.134 |
| 7,891,684 B1 | 2/2011 | Luttinen et al. | |
| 7,967,310 B2 | 6/2011 | Frasch et al. | |
| 2005/0275183 A1 | 12/2005 | Amano | |
| 2009/0218783 A1 * | 9/2009 | Brandl et al. | 280/124.135 |
| 2011/0291379 A1 * | 12/2011 | Yanagida | 280/124.134 |

FOREIGN PATENT DOCUMENTS

| | | |
|---|---|---|
| DE | 101 33 424 | 1/2003 |
| DE | 102 07 654 | 9/2003 |
| DE | 10 2007 063 545 | 6/2009 |
| EP | 1 738 939 A3 * | 1/2007 |
| GB | 2 172 254 A * | 9/1986 |
| WO | WO 2008/122857 A1 * | 10/2008 |

\* cited by examiner

MULTI-LINK REAR WHEEL AXLE FOR A
MOTOR VEHICLE

CROSS REFERENCE TO RELATED
APPLICATION

This application claims priority under 35 USC 119 to German Patent Appl. No. 10 2011 055 572.2 filed on Nov. 22, 2011, the entire disclosure of which is incorporated herein by reference.

BACKGROUND OF THE INVENTION

1. Field of the Invention

The invention relates to a multi-link rear wheel axle for a motor vehicle for connecting a wheel support to a vehicle body with link arms that are arranged in an upper link plane and in a lower link plane, one link arm in the upper link plane is configured as a track rod.

2. Description of the Related Art

Multi-link rear wheel axles are sufficiently well known and have link arms arranged in a lower link plane and in an upper link plane to absorb as far as possible five of the six degrees of freedom of a body in space. Merely one degree of freedom remains for the compression and rebound of the vehicle wheel. A construction of this type should of course be accompanied by the maximum possible driving comfort while ensuring that the vehicle remains on the desired track if longitudinal or lateral forces of any kind occur. Five-link rear wheel axles are known in which five individual link arms produce a connection from the vehicle body to the wheel support. This type of multi-link rear wheel axle affords very high comfort and very great variability with regard to the adjustability of the wheel support, but requires a much greater amount of installation space and a greater amount of installation work than multi-link rear wheel axles that use triangular link arms, for example.

It is therefore an object of the invention to provide a multi-link rear wheel axle that has the functionality of a real five-link rear wheel axle with less required installation space and less installation work.

SUMMARY OF THE INVENTION

This object is achieved by the fact that, in the upper link plane, two link arms are configured as rear and front transverse link, as viewed in the direction of driving, which in each case have articulation points for the wheel support and the vehicle body. The front transverse link is configured as a track rod. A link arm, which is configured as a longitudinal link, connects the rear transverse link via an articulation point in the vicinity of the wheel support to the front transverse link via an articulation point arranged in the vicinity of the vehicle body. Two link arms in the lower link plane are configured as rear and front transverse link, as viewed in the direction of driving, and in each case have articulation points for the wheel support and the vehicle body so that the rear and the front transverse link in the lower link plane form a virtual pole that lies in the lower link plane outside the latter and behind the axle of the wheel support. In this way, an articulation point is saved in each case on the wheel support and on the vehicle body. The multi-link rear wheel axle nevertheless has the comfort of a five-link rear wheel axle. Additionally, the wheel moves in the toe-in during braking and in the case of a lateral force.

The track rod can be configured as an active track rod to adapt the track adjustment in certain driving situations, and accordingly to ensure the greatest comfort and the greatest driving safety in every driving situation. The articulation point of the longitudinal link advantageously can be mounted in the rear transverse link in an adjustable bush. Thus, a longitudinal elasticity of the multi-link rear wheel axle can be set via the bush. Furthermore, an adjustable bush advantageously is provided in the front transverse link of the upper link plane and a lateral-force rigidity of the multi-link rear wheel axle can be set via the adjustable bush. Both bushes can be arranged and set in such a way that no more relative movements have to be carried out in the case of suspension movements. The wheel likewise moves under lateral force in the curve into toe-in as a result of the optimally set lateral-force rigidity and therefore the driving behavior is stabilized. The articulation point of the longitudinal link for the front transverse link advantageously is configured as an eccentric, via which the toe-in can be set by a tool.

In the following text, the invention will be explained in greater detail using one preferred embodiment and with reference to the appended drawing.

DETAILED DESCRIPTION OF THE PREFERRED
EMBODIMENTS

Figure 1:
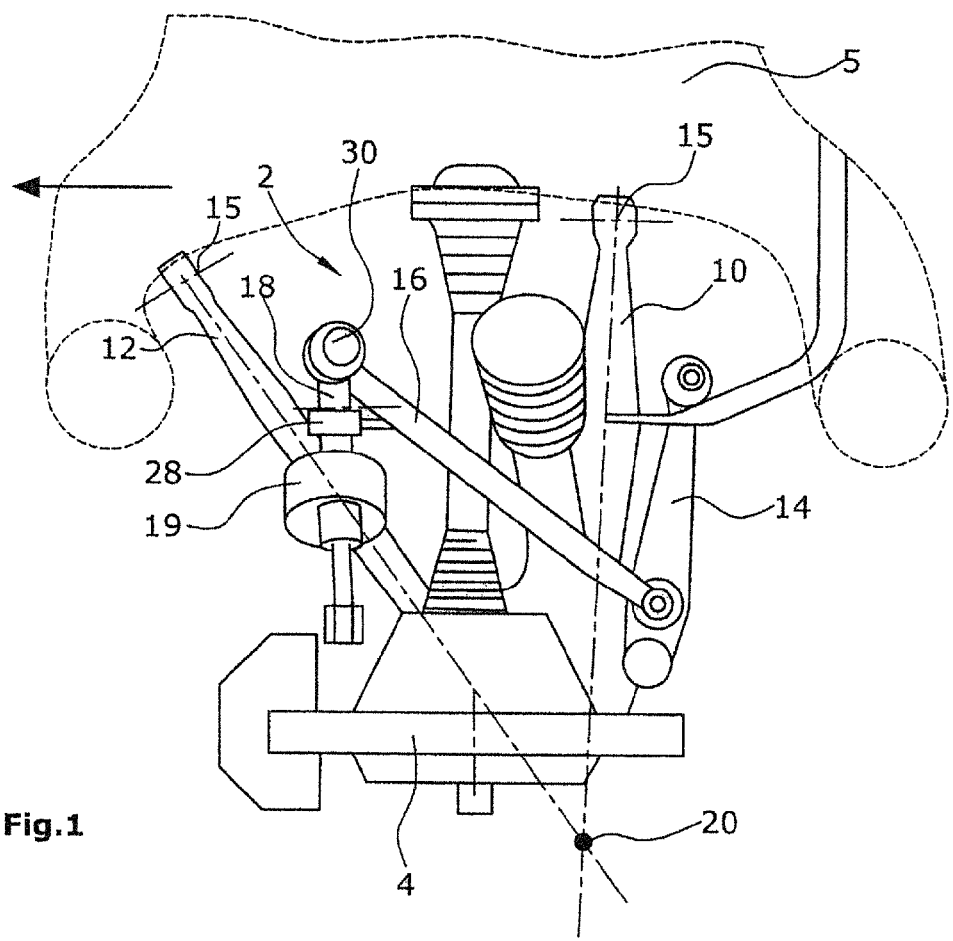
FIG. 1 is a plan view of a multi-link rear wheel axle according to the invention.
Figure 2:
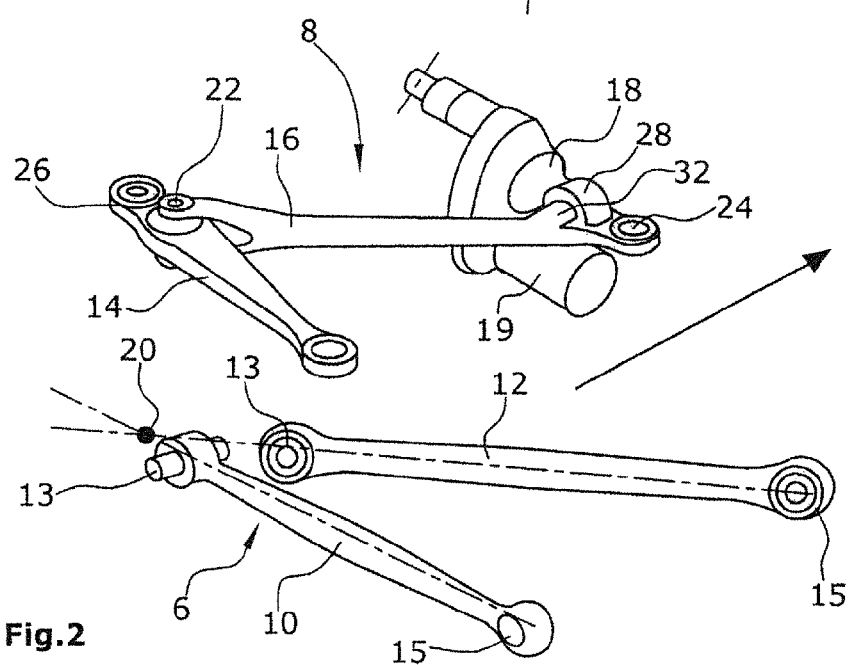
FIG. 2 is a perspective exploded view of a lower link plane and an upper link plane of the multi-link rear wheel axle according to the invention.

FIG. 1 is a plan view of a multi-link rear wheel axle 2 for a motor vehicle for connecting a wheel support 4 to a vehicle body which is not shown here for the sake of clarity. As is apparent, from FIG. 2, link arms 10, 12, 14, 16, 18 are provided in a lower link plane 6 and in an upper link plane 8.

Two link arms 10, 12 configured as transverse links are arranged in the lower link plane. The front transverse link 12 in the driving direction has a significant longitudinal component and thus can absorb longitudinal forces, whereas the rear transverse link 10 as viewed in the driving direction is arranged substantially in the transverse direction. Both transverse links 12 form a virtual pole 20. This pole 20 lies in the lower link plane 6 at a position relative to the vehicle body that is outward of the front and rear link arms 10, 12 of the lower link plane 6 and behind the axle of the wheel support 4. As a result, the wheel can rotate in toe-in during braking and in the case of a lateral force. Moreover, both transverse links 10, 12 are connected movably via articulation points 13 to the wheel support 4 and via articulation points 15 to the body 5.

In the upper link plane 8, the link arm 14 and the link arm 18 are likewise configured as transverse links. The front transverse link 18 in the driving direction is configured as a track rod. The track rod 18 is configured as an active track rod with an activator 19. A further link arm 16 is configured as a longitudinal link and is coupled to both transverse links 14, 18. A first articulation point 22 of the longitudinal link 16 is coupled to the transverse link 14 in the vicinity of the wheel support 4. The longitudinal link 16 is arranged on the transverse link 18 in the vicinity of the vehicle body by way of a second articulation point 24.

In the illustrated embodiment, the articulation point 22 is mounted in an adjustable bush 26 that enables the longitudinal elasticity of the multi-link rear wheel axle 2 to be set. The articulation point 24 is configured as an eccentric and also is arranged in an adjustable bush 28 so that a rotation of the eccentric 24 influences the lateral-force rigidity of the multi-link rear wheel axle 2. For simple adjustability, the eccentric can have an integrally formed external Torx 30 so that precise setting is possible via a corresponding Torx tool. The bush 28 is provided in the front transverse link 18 and has a supporting point 32 of the longitudinal link 16.

What is claimed is:

1. A multi-link rear wheel axle for a motor vehicle for connecting a wheel support to a vehicle body, comprising link arms arranged in upper and lower link planes, the upper link plane having rear and front transverse link arms, as viewed in the direction of driving, each of the rear and front transverse link arms in the upper link plane having articulation points for the wheel support and the vehicle body, the front transverse link arm of the upper link plane being a track rod, the upper link plane further having a longitudinal link arm connecting the rear transverse link arm of the upper link plane via an articulation point in the vicinity of the wheel support to the front transverse link arm of the upper link plane via an articulation point in the vicinity of the vehicle body, front and rear transverse link arms in the lower link plane, as viewed in the direction of driving, each of the front and rear link arms of the lower link plane having articulation points for the wheel support and the vehicle body so that the rear and the front transverse link arms in the lower link plane form a virtual pole that lies in the lower link plane at a position relative to the vehicle body that is outward of the front and rear link arms of the lower link plane and behind the axle of the wheel support.

2. The multi-link rear wheel axle of claim 1, wherein the track rod is an active track rod.

3. The multi-link rear wheel axle of claim 1, wherein the articulation point of the longitudinal link arm of the upper link plane is mounted in the rear transverse link arm of the upper link plane in a rear adjustable bush that enables longitudinal elasticity of the multi-link rear wheel axle to be set.

4. The multi-link rear wheel axle of claim 3, wherein a front adjustable bush is provided in the front transverse link arm of the upper link plane, the front adjustable bush enabling a lateral-force rigidity of the multi-link rear wheel axle to be set.

5. The multi-link rear wheel axle of claim 4, wherein the articulation point of the longitudinal link arm for the front transverse link arm of the upper link plane is an eccentric, via which the toe-in can be set by means of a tool.

\* \* \* \* \*